W. A. TELGA.
ANIMAL TRAP.
APPLICATION FILED AUG. 31, 1921.

1,401,011.

Patented Dec. 20, 1921.

Inventor
Walter A. Telga

By J. K. Bryant
Attorney

UNITED STATES PATENT OFFICE.

WALTER A. TELGA, OF ALBION, NEW YORK.

ANIMAL-TRAP.

1,401,011. Specification of Letters Patent. Patented Dec. 20, 1921.

Application filed August 31, 1921. Serial No. 497,093.

*To all whom it may concern:*

Be it known that I, WALTER A. TELGA, a citizen of the United States of America, residing at Albion, in the county of Orleans and State of New York, have invented certain new and useful Improvements in Animal-Traps, of which the following is a specification.

The primary object of the invention is the provision of an animal trap designed for catching barn rats, muskrats, rabbits, skunks and the like in such a manner as to prevent the animals from releasing themselves after they have been caught by the springing of the trap.

A further object of the invention is to provide a metal animal trap that is strong and durable in construction, easy and inexpensive to manufacture and one that can be set up for use wherever desired such as in a field or burrow whereby the animal may be caught and held upon grasping the bait during the onward travel of the animal.

With these general objects in view and others that will appear as the nature of the invention is better understood, the same consists in the novel construction, combination and arrangement of parts hereinafter more fully described, illustrated in the accompanying drawing, and pointed out in the appended claims.

Figure 1:
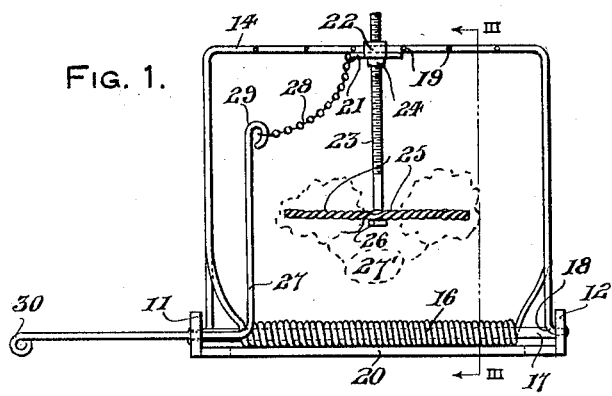
Figure 2:
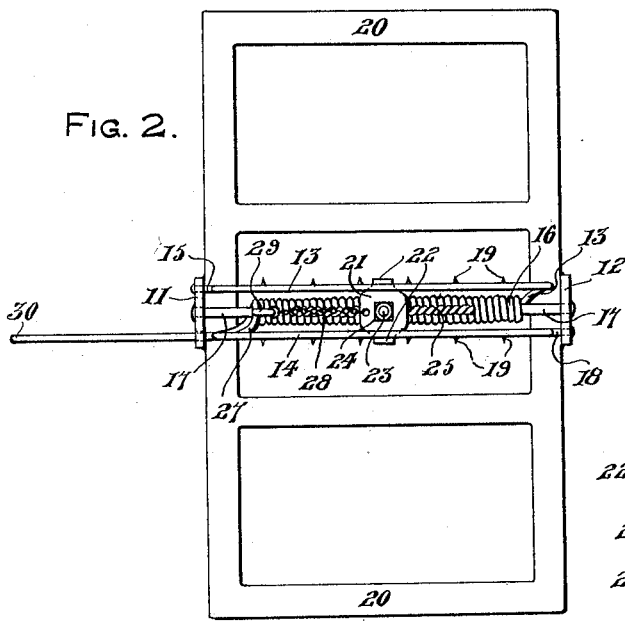
Figure 4:
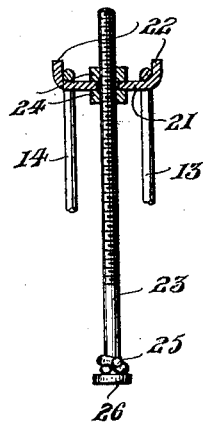
Figure 3:
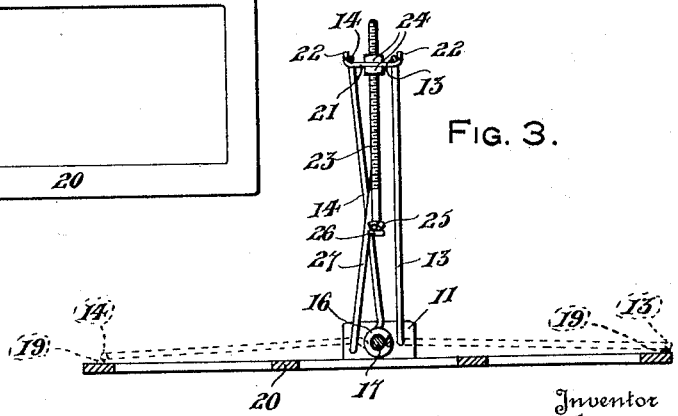

In the drawing forming a part of this application and in which like designating characters refer to corresponding parts throughout the several views, Figure 1 is an end elevational view of the trap set for operation, Fig. 2 is a top plan view thereof, Fig. 3 is a vertical longitudinal sectional view taken upon line III—III of Fig. 1, and Fig. 4 is an enlarged detail sectional view taken longitudinally of the trap through the bait holder with the jaw members shown in section and broken away.

Referring more in detail to the drawing, the trap provides a rectangular grid iron base 10 having opposite upstanding ears 11 and 12, opposite jaws 13 and 14 being pivoted to the said ears.

The jaws 13 and 14 are perfectly formed of a single piece of resilient wire having one end 15 journaled in the ear 11 and bent transversely of the base 10 to form the U-shaped jaw 13. The wire is then formed into a helical spring portion 16 surrounding a central shaft 17 between the ears 11 and 12 with the wire at the opposite end of the coil 16 bent to form the other U-shaped jaw 14 having a terminal foot 18 journaled in the ear 12. Suitable barbs or points 19 are preferably provided upon the outer sides of the jaws 13 and 14 facing the transverse end portions 20 of the base 10. The resiliency of the wire of which the jaws 13 and 14 as well as the coil spring 16, are formed, is such that the tendency of the jaws is to close into engagement with the upper faces of the base portions 20, as indicated by dotted lines in Fig. 3 of the drawing, the setting of the trap requiring the upward and forward forcible movement of the jaws to the positions illustrated by the different views of the drawing it being evident that the releasing of the jaws permits the spring portion 16 to forcibly close the jaws with their points 19 into engagement with the base portions 20.

A U-shaped trip plate 21 is positionable beneath the upper transverse or toothed portions of the jaws 13 and 14 when the same are positioned substantially parallel with the trap set, the upturned ends or flanges 22 of the plate 21 engaging the said jaws whereby the jaws are prevented from separation until the plate 21 is removed or tripped.

A bait-holder is carried by the trip plate 21 in the form of a screw 23 centrally positioned through the plate 21 and adjustably secured thereon by lock nuts 24 while a transverse member 25 formed of twisted wire is provided adjacent the head 26 of the screw 23 for mounting bait upon its projecting ends as illustrated by dotted lines at 27′ in Fig. 1.

From this detailed description of the invention it will be apparent that an animal walking across the base 10 and moving the bait 27′ thereby releases the plate 21 from the jaws 13 and 14, permitting the spring portion 16 to quickly and forcibly close the jaws upon the base ends 20 and catching the animal across the back with the pins 19 in engagement with the animal, preventing escape. By holding the animal by its body it is prevented from effecting its own escape by severing a foot or leg as often happens with some forms of traps.

An angular anchoring wire 27 freely extends through the lug 11 having a chain 28 connected between the plate 21 and a loop 29 at the inner end of said wire and whereby the plate 21 with the bait-carrier are secured to the base 10 preventing them from being carried away by animals. A similar loop 30 at the opposite outer end of the wire 27 serves the purpose of anchoring the trap whenever it is found desirable to do so. A serviceable and strong trap for catching many different kinds of animals is provided and while the form of the invention herein set forth is believed preferable it will nevertheless be understood that minor changes may be made without departing from the spirit and scope of my invention.

What I claim as new is:—

1. An animal trap comprising a base and integral resilient jaws oppositely pivoted transversely thereof and a helical spring integral with the opposite ends of said jaws positioned therebetween and adapted for operating the jaws when the trap is set.

2. An animal trap comprising a base, opposite ears centrally carried by the base, a resilient wire having its opposite ends pivoted in said ears and bent into the form of a pair of jaws and a spring between the ears, and a bait-carrying trip plate adapted for engaging the jaws when in their set substantially parallel arrangement.

3. An animal trap comprising a base having opposite ends, opposite ears centrally carried by the base, a central shaft secured between said ears, a helical spring surrounding said shaft having opposite end portions of U-shape formation with terminal portions pivoted in said ears at the opposite side of the base.

4. An animal trap comprising a base having opposite ends, opposite ears centrally carried by the base, a central shaft secured between said ears, a helical spring surrounding said shaft having opposite end portions of U-shape formation with terminal portions pivoted in said ears at the opposite side of the base, a trip plate having upturned ends adapted for contact with the jaw portions when the trap is set, the jaw portions adapted upon release for springing into engagement with the ends of the base and a bait-holder carried by said plate.

5. An animal trap comprising a base, opposite ears centrally carried by the base, a resilient wire having its opposite ends pivoted in said ears and bent into jaw and spring formation between the ears, a bait-carrying trip plate adapted for engaging the jaws when in their set substantially parallel arrangement, a chain secured to said plate and an anchoring wire angularly positioned through one of said ears.

In testimony whereof I affix my signature.

WALTER A. TELGA.